Feb. 20, 1934.     P. W. BEGGS     1,947,965
COUPLING DEVICE
Filed Aug. 23, 1930
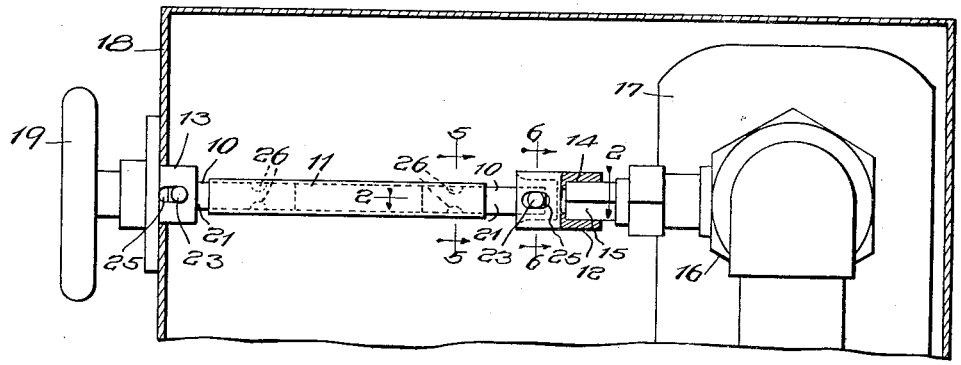
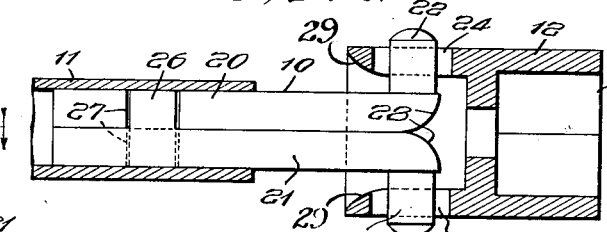
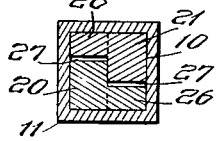
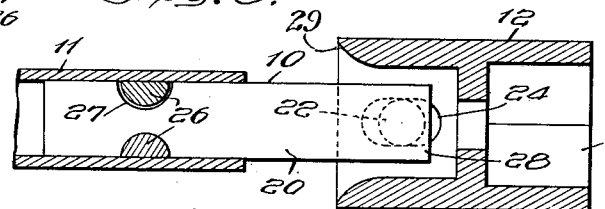
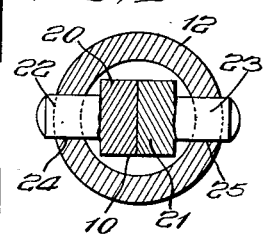
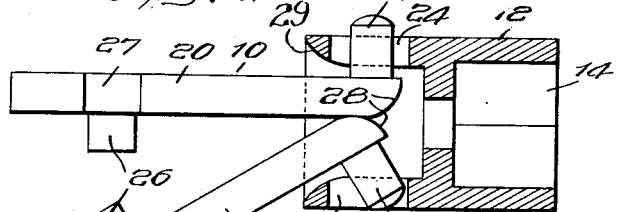
Inventor:
Paul W. Beggs
By Hill & Hill
Attys Patented Feb. 20, 1934

1,947,965

UNITED STATES PATENT OFFICE 1,947,965

COUPLING DEVICE

Paul W. Beggs, Chicago, Ill., assignor, by mesne assignments, to Jas. P. Marsh Corporation, Chicago, Ill., a corporation of Illinois Application August 23, 1930. Serial No. 477,359

6 Claims. (Cl. 64—91)

The invention relates to coupling devices and primarily to devices of this character which are designed to couple shaft sections together to transmit the rotative movement of one section to another.

The invention has as its prime object the provision of a simple construction whereby one shaft section may be readily connected and disconnected with another section and which will permit pivotal movement of the shaft sections.

It is a further object of the invention to employ one of the shaft sections as an element of means for maintaining said coupling and shaft sections in cooperative and separable relation with each other.

It is an object of the invention to provide a construction capable of being associated with or to be inserted into an end of a shaft section, the coupling having means whereby connection and disconnection of the elements may be effected by arranging the elements forming the connection relatively to each other so that disconnection and association of the shaft section and coupling device may be effected.

It is another object of the invention to construct the coupling of two portions which, when arranged in parallel relation to each other, maintain the elements forming the connection in associated relation to each other, one of said elements of the coupling being movable relatively to the other to thereby arrange said elements of the connection relatively to the other element to accomplish association and disconnection of said coupling device and the shaft section.

The invention has as a further object providing the elements forming the coupling with means for limiting relative endwise movement of said elements, however, permitting separation of said elements in a lateral direction to thereby arrange the elements forming the connection so that association and separation of the coupling and shaft section may be accomplished.

The invention has these and other objects, all of which will be explained in detail and more readily understood when read in conjunction with the accompanying drawing forming a part hereof, it being manifest that changes and modifications may be resorted to without departing from the spirit of the appended claims forming a part hereof.

In the drawing, Fig. 1 is an end view of a radiator and a casing therefor having a valve for controlling the supply of the heating medium to the radiator, the device embodying the invention being associated with the stem of the valve and forming a connection between said valve and a handle located outside of the casing for manipulating the valve;

Fig. 2 is a section taken on line 2—2 of Fig. 1;

Fig. 3 is a section taken on line 3—3 of Fig. 2;

Fig. 4 is a plan sectional view showing elements of the coupling in a position which they assume to accomplish connection and disconnection of the coupling;

Fig. 5 is a section taken on line 5—5 of Fig. 1; and

Fig. 6 is a section taken on line 6—6 of Fig. 1.

Whereas the invention is herein shown as applied to a radiator and radiator casing for actuating the valve thereof, it is understood that the construction is not limited to the particular use herein shown as the invention is adaptable in a widely varied manner and in fact in any situation where it is desirable to separably connect shaft sections with each other.

The embodiment of the invention illustrated in the drawing contemplates the utilization of one or more coupling devices generally designated 10, one end of which is connected with a tubular shaft 11, the opposite end of the couplings 10 being connected to a shaft section such as that designated 12. The shaft section 12 may, as illustrated, be formed to provide the opening 14 for the reception of another shaft section such as the stem 15 of the valve 16, the latter of which controls the flow of the heating medium to the radiator 17. As illustrated, the valve 16 and the radiator 17 are housed within a casing 18, the structure involving the shaft sections 11, 12 and 13 and the coupling device 10 being, in the present instance, connected with a handle 19 and provide means whereby motion of the handle 19 is transmitted to the valve stem 15 to thus manipulate and control the valve 16.

The coupling devices generally designated 10 form a connection between the shaft section 11 and those designated 12 and 13 and said coupling devices 10 are composed of two elements or members 20 and 21. One end of said elements 20 and 21 are designed to be inserted into the adjacent end of the shaft section 11, the opposite end of the elements 20 and 21 being designed to be inserted into the adjacent end of a shaft section such as 12 to form a driving connection between the shaft sections 11 and 12.

Each of the elements 20 and 21 is provided with a projection respectively designated 22 and 23 which is respectively designed to enter elongated openings or apertures 24 and 25 provided in a shaft section such as 12 or that designated 13. It is manifest that when the projections 22 and 23 are arranged in the openings 24 and 25 that any rotative movement applied to the shaft section such as 11 will be transmitted to the shaft section 12. It is further manifest that the connection formed between the projections 22 and 23 and the end of the shaft section 12 provide means whereby the shaft sections 11 and 12 may pivot with relation to each other.

The elements 20 and 21 are each respectively provided with a lug 26 and a recess 27 which provide means to maintain the elements 20 and 21 against relative or respective endwise movement and in addition provide means preventing movement thereof in one direction and separation of said elements by movement thereof about the projections 22 and 23 as a pivot. These lugs and recesses 26 and 27 permit the elements 20 and 21 to be separated from each other upon movement of said elements in a lateral direction relatively to each other upon the projections 22 and 23 as the pivot. The members 20 and 21 are movable relatively as indicated by the position of the member 21 in Fig. 4 in order to position the projections such as 22 or 23 within the openings 24 or 25, respectively, and to remove the projections from said openings to disconnect the coupling from the shaft section 12.

To facilitate arranging one of the elements such as 21 relatively to the other element 20 to accomplish association and disassociation of the coupling and a shaft section such as 12, the ends of the elements 20 and 21 adjacent the projections 22 and 23 are rounded as indicated at 28 which will allow one or the other of the elements to assume the position of the element 21 as shown in Fig. 4.

Each of the elements 20 and 21 are preferably formed of relatively flat strip material which, when one is associated with the other, substantially corresponds in cross section of the bore of the opening provided in the shaft section such as 11 so that practically no relative movement can take place between the coupling and the shaft when these elements are rotated and it may be here stated that the openings 24 and 25 are of an elongated character and that the mouth of the opening of the shaft section 12 into which one end of the coupling device is inserted is flared as indicated at 29 to thereby provide for pivotal movement between the coupling and the shaft section 12 in transverse directions when the coupling and the shaft section 12 are connected with each other.

When it is desired to effect or accomplish association or disconnection of the coupling device 10, the shaft section 11 is withdrawn from associated relation with the elements 20 and 21. This allows either one of the elements 20 or 21 to be arranged in the relative position shown in Fig. 4, in which position one or the other of the projections 22 or 23 may be withdrawn from its respective aperture 24 or 25 which allows withdrawal of either of said elements 20 or 21 from the bore of the shaft section 12, after which it is evident the other element forming the coupling 10 may also be withdrawn.

When it is desired to effect a connection between the coupling device 10 and a shaft section such as 12, one of the elements 20 or 21 is inserted into the bore of the shaft section 12 until its respective projection 22 or 23 is arranged opposite one of the elongated apertures 24 and 25. The particular element 20 or 21 is then moved laterally causing its particular projection to enter one of the slots or openings 24 or 25. The other element is then arranged at an inclination to the first mentioned element 20 or 21 with the end of the projection located in an end of its slot or opening in the shaft section such as 12 with which it cooperates and this last mentioned element is then brought into parallelism with the other element forming the coupling device. This movement of this element is partially permitted because of the rounded end 28 of the elements 20 and 21 which allows the elements 20 and 21 to be moved to and from parallelism and the projection to enter the opening and be arranged transverse thereto which thus thereafter prevents withdrawal of the elements 20 and 21 from the shaft section 12. It may be here stated that when the elements 20 and 21 assume this last mentioned relation, that the recesses and projections designated 26 and 27 are brought into cooperative relation with each other and thus prevent relative endwise movement of the elements 20 and 21. When the elements 20 and 21 of the coupling device are arranged in the manner just described, the ends thereof remote from that end provided with the projections 22 and 23 are inserted into the shaft section 11 which securely holds said elements against separation and relative rotation and this will transmit rotative movement applied to the shaft section 11 to the shaft section such as 12 or 13.

Having thus described the invention, what I claim and desire to cover by Letters Patent is:

1. A shaft coupling, said shaft coupling including a pair of members, each of said members having a lateral projection provided at one end, a shaft section provided with a socket having holes in diametrically opposite side walls into which said lateral projections fit to prevent relative rotative motion of said shaft section and members, said members being curved at the ends adjacent the lateral projections to provide for relative rotative movement of said members, a tubular shaft section into which the opposite end of said members is inserted and interfitting means on said members within said tubular shaft section for preventing relative movement of said members.

2. A shaft coupling including a pair of members, each of said members having a lateral projection provided at one end, a shaft section provided with a socket and having apertures formed therein adapted to receive said projections to prevent relative movement of said shaft section and members, said members being cut away at the ends adjacent the lateral projections to provide for relative movement of said members, a tubular shaft section adapted to receive the opposite ends of said members, and cooperating means formed on said members within said tubular section for preventing relative movement of said members.

3. A shaft coupling including a pair of members, each of said members having a lateral projection provided at one end, a shaft section provided with a recess and having oppositely disposed apertures formed therein adapted to receive said projections to prevent relative rotative movement of said shaft section and members, said members being cut away on their adjacent sides at the ends adjacent the lateral projections to provide for relative rotative movement of said members, a tubular shaft section adapted to receive the opposite end of said members, and cooperating means formed on the respective members within said tubular shaft section for preventing relative longitudinal movement of said members.

4. A shaft coupling including a pair of elongated members, each of said members having a lateral projection provided at one end, a shaft section provided with an axial recess and having oppositely disposed elongated apertures formed in the recessed portion of said shaft section adapted to receive said projections to prevent relative rotative movement of said shaft section and members, said members being curved on their adjacent sides at the ends adjacent the lateral projections to provide for relative rotative movement of said members, a tubular shaft section adapted to receive the opposite end of said members and operatively related thereto in a manner to be rotatable therewith, and cooperating means formed on the respective members within said tubular shaft section for preventing relative movement of said members.

5. A shaft coupling comprising a pair of elongated members, oppositely disposed lateral projections on the respective members adjacent one of their end portions, a shaft section having an axially disposed socket formed therein and having oppositely disposed elongated apertures formed in the wall of said socket, said apertures being adapted to receive said projections to prevent relative rotative movement of said shaft section and members, said members being curved on their adjacent sides at their ends adjacent the lateral projections to provide for relative movement of said members, a tubular shaft section adapted to receive the opposite end portions of said members and operatively related thereto in a manner to rotate therewith, said members having transversely extending recesses formed therein within said tubular shaft, and transversely extending lugs formed on the respective members in the tubular shaft, the lugs of the respective members being adapted to engage the recesses of the opposite member for preventing relative longitudinal movement of said members.

6. A shaft coupling comprising a pair of elongated members of rectangular cross section, oppositely disposed lateral projections on the respective members adjacent one of their end portions, a shaft section having an axially disposed socket formed therein and having oppositely disposed elongated apertures formed in the wall of said socket, said apertures being adapted to receive said projections to prevent relative rotative movement of said shaft section and members, said members being curved on their adjacent sides at their ends adjacent the lateral projections to provide for relative lateral movement of said members in positioning said projections in and removing them from said apertures, a tubular shaft of rectangular cross section adapted to receive the opposite end portions of said members, the portion of said members within said tubular shaft being provided respectively with transversely extending lugs and grooves, the lug and groove on one member being adapted to cooperate respectively with the groove and lug on the other member for preventing relative longitudinal movement of said members.

PAUL W. BEGGS.